(12) United States Patent
Buttelmann

(10) Patent No.: US 10,124,878 B2
(45) Date of Patent: Nov. 13, 2018

(54) DOOR ARRANGEMENT FOR THE INTERIOR OF AN AIRCRAFT AND AIRCRAFT COMPRISING SUCH A DOOR ARRANGEMENT

(71) Applicant: Airbus Operations GmbH, Hamburg (DE)

(72) Inventor: Maik Buttelmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/147,470

(22) Filed: May 5, 2016

(65) Prior Publication Data
US 2016/0325817 A1    Nov. 10, 2016

(30) Foreign Application Priority Data

May 6, 2015  (EP) ..................................... 15166655

(51) Int. Cl.
*B64C 1/14* (2006.01)
*E05F 15/63* (2015.01)
(Continued)

(52) U.S. Cl.
CPC .......... *B64C 1/1461* (2013.01); *B64C 1/1469* (2013.01); *E05D 15/04* (2013.01);
(Continued)

(58) Field of Classification Search
CPC .............................. B64C 1/1461; B64C 1/1469
(Continued)

(56) References Cited

U.S. PATENT DOCUMENTS 3,886,425 A * 5/1975 Weiss ...................... E05F 15/63
                                                        318/267
5,255,946 A  10/1993 Allerding
(Continued)

FOREIGN PATENT DOCUMENTS

GB         2 144 484      3/1985
WO      WO 84/01404      4/1984
WO    WO 2014/027215    2/2014

OTHER PUBLICATIONS

European Search Report for Application No. 15166655.9 dated Sep. 28, 2015.

*Primary Examiner* — Marcus Menezes
(74) *Attorney, Agent, or Firm* — Jenkins, Wilson, Taylor & Hunt, P.A.

(57) ABSTRACT

A door arrangement for an aircraft interior and an aircraft with such door arrangement, including a frame portion and a door blade hinged to the frame portion and pivotable between a closed position, where the door blade closes a door opening, and an open position, where the door blade allows access. The door arrangement includes a lever arm and an actuator mounted to the frame portion and operable to selectively move the door blade between the open and closed positions via the lever arm engaging the door blade and the actuator. The actuator is movable into a first actuator position and into a second actuator position. The actuator is movable into the second actuator position such that the door blade is able to move from the closed position towards the open position independent of the actuator while the actuator remains in the second actuator position.

14 Claims, 6 Drawing Sheets

(51) Int. Cl.
  *E05F 15/53* (2015.01)
  *E05F 15/611* (2015.01)
  *E05D 15/04* (2006.01)

(52) U.S. Cl.
  CPC ............ *E05F 15/53* (2015.01); *E05F 15/611* (2015.01); *E05F 15/63* (2015.01); *E05Y 2201/624* (2013.01); *E05Y 2600/46* (2013.01); *E05Y 2900/502* (2013.01)

(58) Field of Classification Search
  USPC .................................................. 49/339, 340
  See application file for complete search history.

(56) References Cited

U.S. PATENT DOCUMENTS

| | | | | | |
|---|---|---|---|---|---|
| 5,752,344 | A | * | 5/1998 | Richmond | E05F 15/63 49/339 |
| 5,838,125 | A | * | 11/1998 | Choi | D06F 39/14 318/285 |
| 7,104,589 | B2 | * | 9/2006 | Takeda | E05F 15/40 296/146.8 |
| 2002/0092951 | A1 | | 7/2002 | Haviv | |
| 2004/0118976 | A1 | * | 6/2004 | Albertelli | B29C 70/30 244/118.5 |
| 2013/0269258 | A1 | * | 10/2013 | Koch | B64C 1/1469 49/67 |

\* cited by examiner

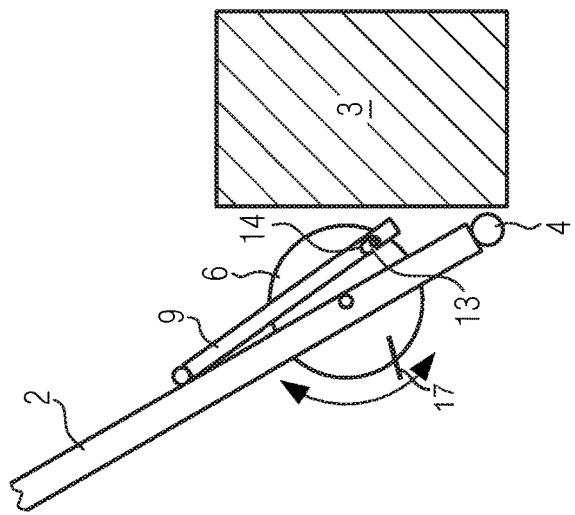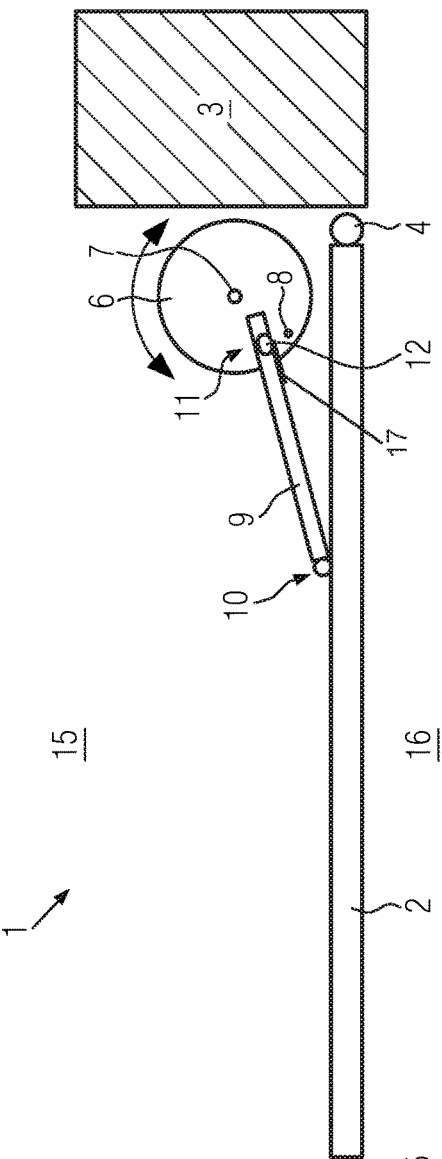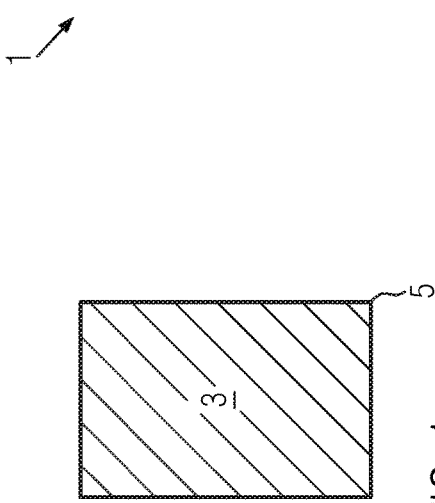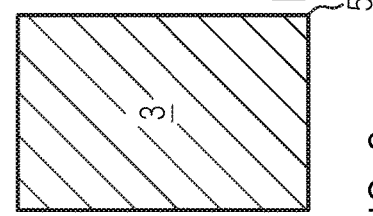
FIG. 1
FIG. 2

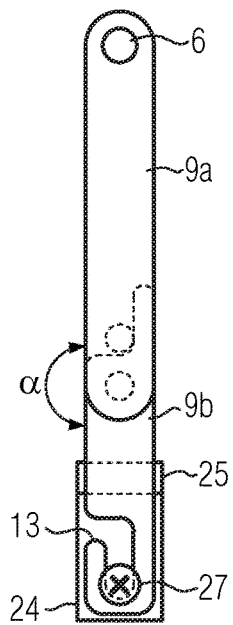
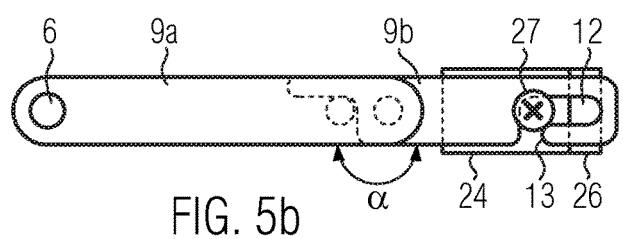
FIG. 5a
FIG. 5b
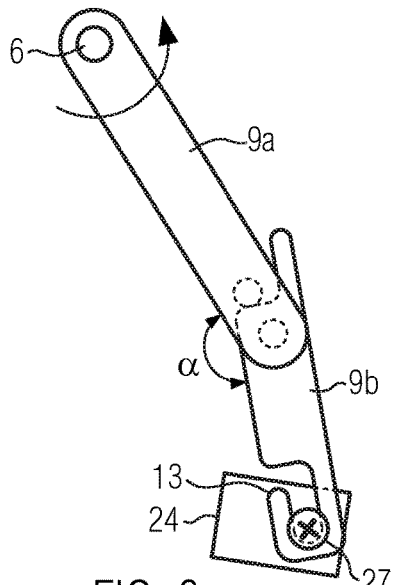
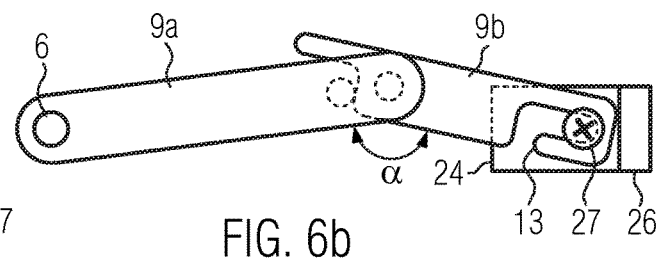
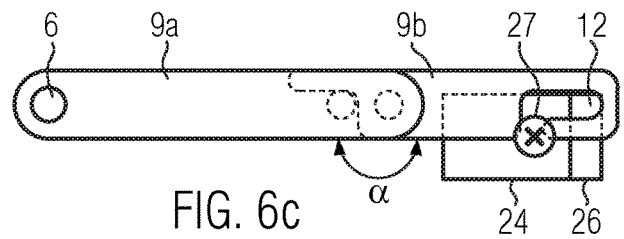
FIG. 6a
FIG. 6b
FIG. 6c

DOOR ARRANGEMENT FOR THE INTERIOR OF AN AIRCRAFT AND AIRCRAFT COMPRISING SUCH A DOOR ARRANGEMENT

CROSS-REFERENCE TO RELATED APPLICATION

This application claims priority to European Patent Application No. 15166655.9 filed May 6, 2015, the entire disclosure of which is incorporated by reference herein.

TECHNICAL FIELD

The present disclosure relates to a door arrangement for the interior of an aircraft, the door arrangement comprising a frame portion, a door blade hinged to the frame portion to be pivotable about a pivot axis between a closed position, in which the door blade closes an opening defined by the frame portion, and an open position, in which the door blade is positioned to allow access through the opening, a lever arm, and an actuator mounted to the frame portion and operable to selectively move the door blade between the open position and the closed position via the lever arm engaging the door blade and the actuator, wherein the actuator is movable into a first actuator position, in which the lever arm is in a first lever arm position and the door blade is in the open position, and into a second actuator position, in which the lever arm is in a second lever arm position and the door blade is in the closed position, and to an aircraft comprising such a door arrangement.

BACKGROUND

Aircraft typically comprise multiple compartments which are separated by walls or a floor. For example, the cockpit or flight deck is separated from the passenger compartment by a wall. In order to provide access between two adjacent compartments a door arrangement may be provided in the wall or floor separating the two compartments. Such door arrangement is typically configured for manual operation for opening and closing a door blade of the door arrangement.

It is desirable to be able to provide for automatic opening and closing of the door blade by an actuator, such as an electrically or pneumatically operable actuator. Such door actuators comprise a lever arm coupled between the actuator and the door blade. The lever arm mechanically couples the door blade to the actuator and translates movement of the actuator into a corresponding movement of the door blade. In this manner it is possible to selectively move the door blade between an open position and a closed position by operating the actuator.

However, it is important to take into consideration that sudden pressure drops may occur inside an aircraft and that in case of a pressure drop, i.e. decompression, in the compartment, into which the door blade moves upon opening, preventing structural damage to the aircraft requires the door blade to rapidly move from the closed position towards its open position. For example, a door arrangement between the cockpit and the passenger compartment is typically configured such that the door blade moves towards the cockpit upon opening, and in case of a pressure drop in the cockpit the door blade must rapidly move from the closed position towards the open position. Such movement may, however, be impeded by the mechanical link between the actuator and the door blade.

SUMMARY

It is an object of the present disclosure to provide a door arrangement for the interior of an aircraft which comprises an actuator and which is adapted to prevent structural damage to the aircraft in case of a pressure drop in the compartment, into which the door blade moves upon opening.

This object is achieved by a door arrangement and by an aircraft according to the disclosure herein. Advantageous embodiments of the door arrangement are also disclosed herein and are the subject matter of the respective dependent claims.

The door arrangement for the interior of an aircraft comprises a frame portion and a door blade hinged to the frame portion to be pivotable about a pivot axis between a closed position, in which the door blade closes a door opening defined by the frame portion, and an open position, in which the door blade is positioned to allow access through the door opening. The frame portion may be a door frame and/or a wall portion surrounding the door opening.

The door arrangement further comprises a lever arm and an actuator, which is mounted to the frame portion and may be, e.g., an electric, hydraulic or pneumatic actuator and which is preferably automatically operable. In this regard, the door arrangement may comprise a control unit adapted for controlling the operation of the actuator. In any case, the actuator is operable to selectively move the door blade between the open position and the closed position via the lever arm engaging the door blade. For this purpose the actuator is movable into a first actuator position, in which the lever arm is in a first lever arm position and the door blade is in the open position, and into a second actuator position, in which the lever arm is in a second lever arm position and the door blade is in the closed position.

Further, the actuator is configured to be movable into the second actuator position such that the door blade is able to move from the closed position towards the open position independent of the actuator while the actuator remains in the second actuator position. In other words, the door blade is then disengaged or decoupled from the actuator with respect to movement from the closed position towards the open position.

The above construction provides the advantage that a door actuator can be used while at the same time decreasing the risk of structural damage to the aircraft in case of rapid decompression with a simple mechanism which does not necessitate providing, e.g., predetermined breaking points causing the door arrangement to be damaged upon occurrence of decompression. In this manner, mandatory certification requirements can be fulfilled after installation of a door actuator of the above type.

In a preferred embodiment the actuator is configured to be movable into a third actuator position, in which the door blade is in the closed position and which the actuator assumes upon reaching the closed position when the actuator is operated to move the door blade from the open position into the closed position. In the third actuator position the lever arm is in engagement with the door blade and with the actuator such that the door blade is prevented from moving from the closed position towards the open position independent of the actuator. Further, movement of the actuator from the third actuator position into the second actuator position changes the engagement between the lever arm and the door blade or actuator such that the movement of the door blade from the closed position towards the open position independent of the actuator is enabled. This construction is very simple and reliable, because the possibility for the door blade to open freely in the closed position is provided merely by moving the lever arm between different positions, so that separate actuation means are not required.

In a preferred embodiment the door arrangement further comprises an engagement element, such as, e.g., a pin, coupled to the actuator or to the door blade. In this regard the engagement element may also be an integral part of the actuator or of a portion or part of the door blade. The lever arm comprises an elongate slot, which may be an elongate through hole or an elongate recess and which is adapted to engage—or, in other words, be engaged by—the engagement element to allow the actuator to effect the movement of the door blade between the open position and the closed position via the lever arm. The elongate slot comprises a lateral opening which, by moving the actuator from the first actuator position to the second actuator position, is positionable such that the engagement element is allowed to escape the slot through the lateral opening, thereby allowing the movement of the door blade from the closed position towards the open position independent of the actuator. In other words, the engagement between the engagement element and the slot is effected by the engagement element extending into or through the slot, so that lateral walls or sidewalls of the slot normally prevent the engagement element from escaping the slot, and the lateral opening is provided in the lateral walls or sidewalls. This construction provides for a particularly simple mechanism.

In the two preceding embodiments it is further preferred to configure and arrange the actuator and the lever arm in such a manner that when operating the actuator to move from the first actuator position into the third actuator position and to move from the third actuator position into the second actuator position the actuator is moved in the same direction. In other words, the third actuator position is between the first and second actuator positions. Further, movement of the actuator from the third actuator position into the second actuator position causes the engagement element to escape the slot through the lateral opening and thereby disengagement of the engagement element from the lever arm to allow the movement of the door blade from the closed position towards the open position independent of the actuator. Thus, this movement decouples completely the lever arm from the actuator. On the other hand, movement of the actuator from the second actuator position into the third actuator position while the door blade is in the closed position causes the engagement element to enter the slot through the lateral opening and thereby engagement of the engagement element with the lever arm to prevent the door blade from moving from the closed position towards the open position independent of the actuator. Thus, this movement couples the lever arm again to the actuator.

In this embodiment it is further preferred if the engagement element is coupled to the actuator, and the lever arm is pivotably secured to the door blade. Alternatively or additionally it is preferred if the door arrangement further comprises a lever arm stop mechanism, which may comprise a spring loaded stop mechanism and/or one or more stop components for abutment by the lever arm and which is arranged such that when the actuator is operated to move the actuator from the first actuator position towards the second actuator position the movement of the lever arm is stopped by the lever arm stop mechanism upon the actuator reaching the third position. The lever arm stop mechanism then defines the second lever arm position, which is a defined position for the engagement element to escape and enter the slot through the lateral opening, i.e. for coupling and decoupling the actuator with respect to the lever arm.

In an alternative embodiment it is preferred to configure and arrange the actuator and the lever arm in such a manner that when operating the actuator to move from the first actuator position into the third actuator position and to move from the third actuator position into the second actuator position the actuator is moved in opposite directions. In other words, the second actuator position is between the first and third actuator positions, so that after the actuator has been moved from the first actuator position into the third actuator position it has to be moved in the opposite direction to reach the second actuator position. Further, movement of the actuator from the third actuator position into the second actuator position causes the engagement element to be positioned within the slot in alignment with the lateral opening when the actuator is in the second actuator position, thereby allowing the movement of the door blade from the closed position towards the open position independent of the actuator by the engagement element escaping the slot through the lateral opening. Thus, this movement does not cause complete disengagement or decoupling of the lever arm from the door blade, but such disengagement or decoupling is caused only when the door blade is moved towards the open position, in particular, e.g., by rapid decompression. On the other hand, movement of the actuator from the second actuator position into the first actuator position causes the engagement element to be positioned within the slot out of alignment with the lateral opening when the actuator is in the first actuator position, thereby preventing the engagement element from escaping the slot through the lateral opening when operating the actuator for moving the door blade from the open position into the closed position. In this embodiment it is preferred if the engagement element is coupled to the door blade, and the lever arm is secured to or an integral part of the actuator.

In this embodiment it is preferred if the door arrangement further comprises a sliding track provided on the door blade, wherein the engagement element is secured to or part of a slider element slidably secured in the sliding track. In particular, the sliding track may be provided in and along an upper edge of the door blade or spaced from and along an upper edge of the door blade, e.g. by a distance block.

In this regard it is further preferred if the door arrangement comprises a first end stop and a second end stop limiting movement of the slider element along the sliding track. In other words, the slider element is movable along the sliding track between the first and second end stops. The slider element abuts the first end stop when the actuator is in the first actuator position and the slider element abuts the second end stop when the actuator is in the second actuator position.

With respect to the two end stops it is preferred if the second end stop is positioned such that, when the actuator is operated to move the door blade from the open position into the closed position by moving the actuator at first from the first actuator position into the third actuator position and subsequently—in the opposite direction—from the third actuator position into the second actuator position, in the third actuator position the slider element abuts the second end stop, the lever arm is in a third lever arm position different from the second lever arm position, and the engagement element is positioned within the slot out of alignment with the lateral opening, and when subsequently moving the actuator from the third actuator position into the second actuator position the abutment between the slider element and the second end stop is maintained and movement of the lever arm from the third lever arm position into the second lever arm position thereby causes movement of the engagement element along the slot into a position in alignment with the lateral opening. This position of the engagement element is reached at the latest when the actuator has reached the second actuator position and the lever arm has accordingly reached the second lever arm position.

For this purpose, the lever arm may advantageously be constructed such that it increases a length thereof and more specifically a distance between a location, at which the lever arm contacts or is secured to the actuator, and the slot when moving between the third lever arm position and the second lever arm position. For example, the lever arm may advantageously comprise two portions, which are connected to each other to be pivotable with respect to each other about a pivot axis, and stop means adapted to limit the pivoting movement of the two portions with respect to each other between a first angle and a second angle. The slot is provided in one of the two portions and the actuator is secured to the other one of the two portions. Each of the two portions may be elongate and preferably straight. The first angle may be 180°, such that in the case of the two portions being straight elongate portions the lever arm assumes a straight elongate configuration. The second angle may be an angle greater than 120° and smaller than 180°, such that in the case of the two portions being straight elongate portions the longitudinal directions of two portions extend at an angle to each other. In this manner, the distance between a location, at which the lever arm contacts or is secured to the actuator, and the slot is greater when the two portions assume the first angle than when the two portions assume the second angle. In the third lever arm position the two portions assume the second angle and in the second lever arm position the two portions assume the first angle. Consequently, the increase of the distance between the location, at which the lever arm contacts the actuator, and the slot upon movement of the actuator from the third actuator position into the second actuator position together with the abutment of the slider element against the second end stop causes the movement of the engagement element along the slot from a position out of alignment with the lateral opening into a position in alignment with the lateral opening. This is because the slider element does not move along the sliding track while at the same time the portion of the lever arm including the slot and the slot itself move with respect to the slider element and the engagement element due to the distance increase. The same may also be achieved with other mechanisms for suitably increasing the length, or more specifically the effective length, of the lever arm.

Alternatively or additionally, with respect to the two end stops it is preferred if the first end stop is positioned such that, when the actuator is operated to move the door blade from the closed position into the open position by moving the actuator from the second actuator position into the first actuator position, the slider element moves along the sliding track from the second end stop towards the first end stop while the engagement element is positioned within the slot in alignment with the lateral opening. Further, the slider element reaches and abuts the first end stop prior to the actuator reaching the first actuator position, and during further movement of the actuator into the first actuator position the abutment between the slider element and the first end stop is maintained and movement of the lever arm into the first lever arm position thereby causes movement of the engagement element along the slot into a position out of alignment with the lateral opening. This position is reached at the latest when the actuator has reached the first actuator position and the lever arm has accordingly reached the first lever arm position. Similar to the case of the second end stop, the movement of the engagement element within the slot is caused because once having reached the first stop element the slider element does not move along the sliding track while at the same time the portion of the lever arm including the slot and the slot itself move with respect to the slider element and the engagement element.

In a preferred embodiment the actuator is a rotary actuator having an axis of rotation spaced from the pivot axis of the door blade. In the case of embodiments comprising a slider element and a sliding track as described above, the sliding is then due to the spaced arrangement of the pivot axis of the door blade and of the rotation axis of the actuator.

The door arrangement may be advantageously utilized in an aircraft, thereby providing an aircraft comprising a first compartment and a second compartment separated by a wall, wherein an aircraft door arrangement according to any of the preceding claims is provided in the wall. In particular, the first compartment may be a cockpit or flight deck and the second compartment may be a passenger compartment. The door arrangement is advantageously configured such that the door blade moves into the second compartment when moving from the closed position into the open position.

BRIEF DESCRIPTION OF THE DRAWINGS

In the following two exemplary embodiments of the door arrangement will be explained in more detail with reference to the drawings.

FIG. 1 shows a schematic cross-sectional view of a first embodiment of a door arrangement according to the present disclosure, wherein the door blade is in the open position.

FIG. 2 shows another schematic cross-sectional view of the door arrangement of FIG. 1, wherein the door blade is in the closed position.

FIG. 5a shows a schematic perspective view of a lever arm and slider element of the door arrangement of FIGS. 3 and 4 when the door blade is in the open position, the actuator is in a first actuator position and the lever arm is in a first lever arm position.

FIG. 5b shows a schematic perspective view of the lever arm and slider element of the door arrangement of FIGS. 3 and 4 when the door blade is in the closed position, the actuator is in a second actuator position and the lever arm is in a second lever arm position.

FIG. 6a shows a schematic perspective view of the lever arm and slider element of the door arrangement of FIGS. 3 and 4 while moving from the position shown in FIG. 5a towards the position shown in FIG. 5b.

FIG. 6b shows a schematic perspective view of the lever arm and slider element of the door arrangement of FIGS. 3 and 4 after the door blade has reached its closed position, wherein the actuator is in a third actuator position and the lever arm is in a third lever arm position.

FIG. 6c shows a schematic perspective view of the lever arm and slider element of the door arrangement of FIGS. 3 and 4 corresponding to the situation of FIG. 5b, wherein as compared to FIG. 6b the actuator has been moved from the third actuator position into the second actuator position and the lever arm thereby has been moved from the third lever arm position into the second lever arm position while the door blade was still in the closed position, and wherein the door blade was subsequently moved slightly out of its closed position towards the open position.

DETAILED DESCRIPTION

Figure 2A:
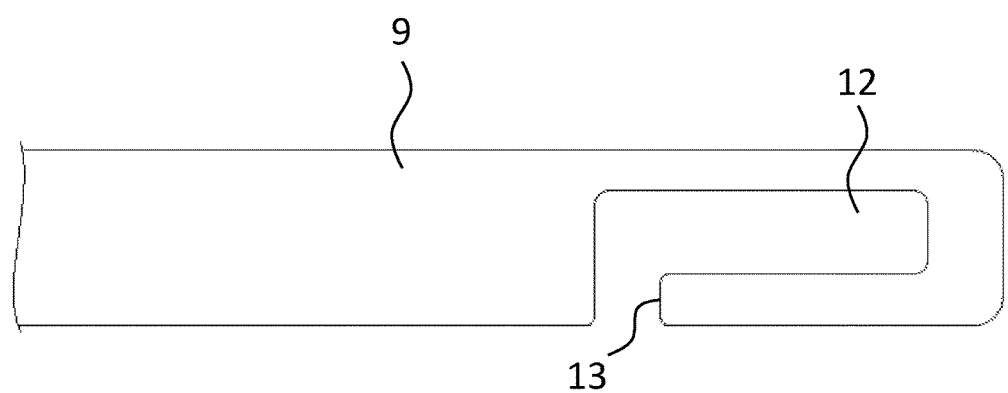
FIG. 2A shows a view of an embodiment of a lever arm illustrated in FIGS. 1 and 2.
Figure 3:
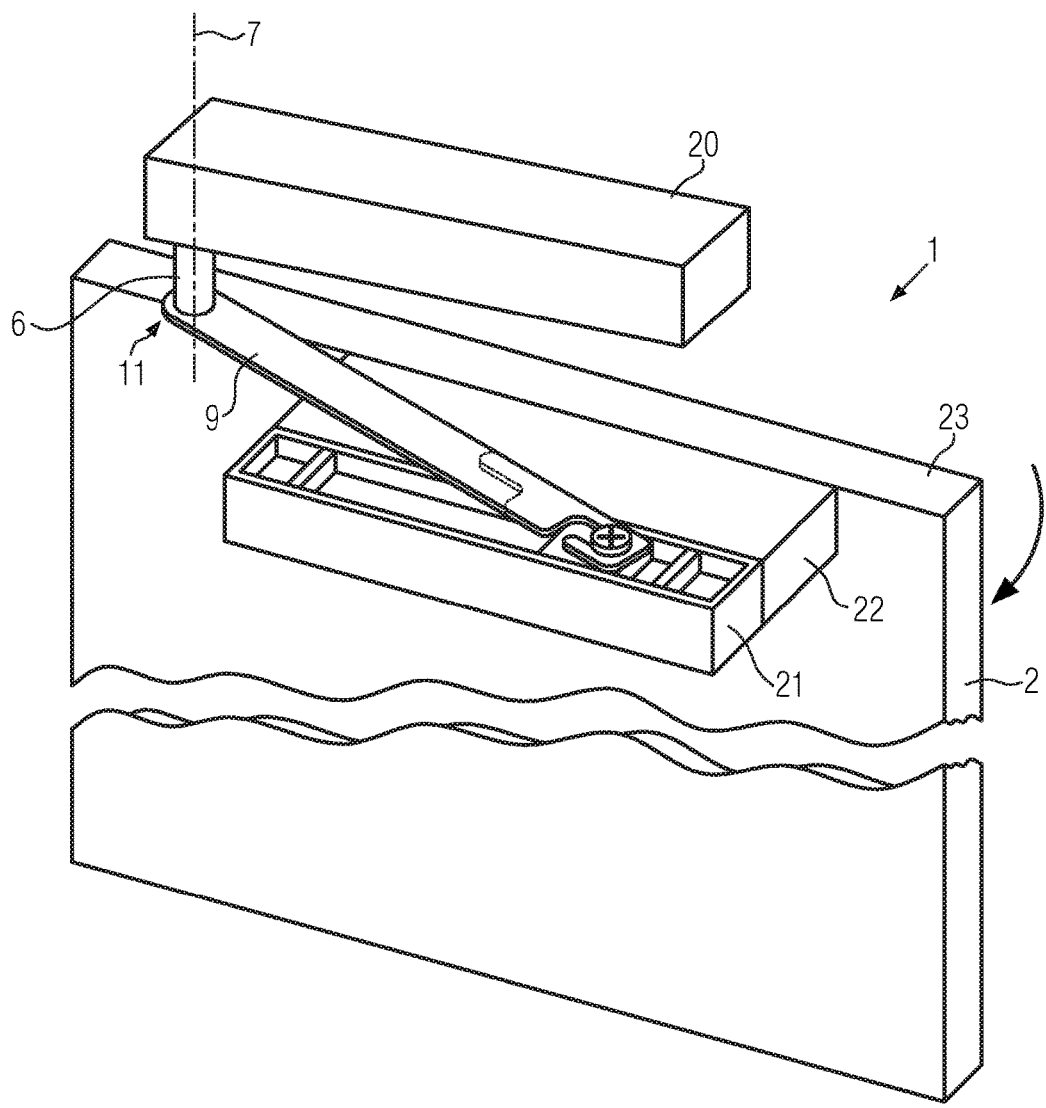
FIG. 3 shows a schematic and simplified perspective view of a second embodiment of a door arrangement according to the present disclosure, wherein the door blade is in the closed position.

The door arrangement 1 shown in FIGS. 1 and 2 is mounted inside an aircraft and comprises a door blade 2 which is pivotably mounted to a wall portion 3 by a hinge 4. The wall portion 3 may, e.g., be part of a lavatory and of a galley of the aircraft. The wall portion 3 separates two aircraft compartments 15 and 16, wherein the compartment 15 may be, e.g., a cockpit or flight deck and the compartment 16 may be, e.g., a passenger compartment. The wall portion 3 defines a door opening 5 which can be selectively opened and closed by the door blade 2 by moving the door blade 2 into the open position shown in FIG. 1 and the closed position shown in FIG. 2, respectively. When moving between the open and closed positions the door blade 2 pivots about a pivot axis defined by the hinge 4.

For the purpose of automatically moving the door blade between the open and closed positions under control of a control unit the door arrangement 1 comprises a rotary actuator 6, which is rotatable about an actuator rotation axis 7, which extends parallel to but spaced from the hinge axis 4. The rotary actuator 6 is driven by, e.g., electric, hydraulic or pneumatic means to rotate about the actuator rotation axis 7 between various actuator positions. The actuator 6 also comprises a pin 8, which extends parallel to but spaced from the actuator rotation axis 7.

An elongate lever arm 9 is permanently and pivotably secured at one end region 10 thereof to the door blade 2. At the opposite end region 11 the lever arm 9 is provided with an elongate through hole 12, which has a generally oval shape and, with respect to the direction of extension of the pin 8 and the actuator rotation axis 7 is laterally defined by sidewalls or lateral walls 14. In the lateral walls 14 a lateral opening 13 is provided allowing the pin 8 to enter and exit the through hole 12 when the actuator 6 and the pin 8 are in specific positions, as will be explained in more detail below. The elongate through hole 12 and lateral opening 13 are depicted in further detail in FIG. 2A.

In the open position of the door blade 2 shown in FIG. 1 the pin 8 extends into or through the through hole 12, such that the actuator 6 is mechanically coupled to the lever arm 9 via the pin 8 and to the door blade 2 via the lever arm 9. The actuator 6 is in a first actuator position, in which the pin 8 is positioned such that it is prevented from exiting the through hole 12 through the lateral opening 13. Thus, the actuator 6 maintains the door blade 2 in the open position, and upon operating the actuator 6 to rotate in the counterclockwise direction from the first actuator position towards the second actuator position shown in FIG. 2, the actuator 6 moves the door blade 2 via the lever arm 9 towards the closed position.

In this process the lever arm 9 moves from the first lever arm position shown in FIG. 1 and corresponding to the first actuator position towards the second lever arm position shown in FIG. 2. The second lever arm position is defined by a stop mechanism 17 and is reached when the door blade 2 reaches the closed position. In this moment the actuator 6 is not yet in the second actuator position shown in FIG. 2, but in an intermediate third actuator position between the first and second actuator positions. In this third actuator position the pin 8 is still in engagement with the through hole 12 to couple the actuator 6 to the lever arm 9. However, the lateral opening 13 is positioned such that upon operating the actuator 6 to rotate it further into the second actuator position the pin 8 escapes the through hole 12 through the lateral opening 13 while the lever arm 9 maintains the defined second lever arm position, thereby mechanically decoupling the actuator 6 from the lever arm 9 and the door blade 2. The lever arm is spring-loaded to maintain it in this position. Consequently, the door blade 2 is then able to move towards the open position independent of the actuator 6, in particular in case of a rapid decompression in the compartment 15, without being impeded by the actuator 6, so that structural damage to the aircraft is prevented.

When operating the actuator 6 to rotate from the second actuator position of FIG. 2 in the clockwise direction, the pin 8 enters the through hole 12 through the lateral opening 13 immediately prior to the actuator 6 reaching the third actuator position, thereby reengaging the pin 8 and the through hole 12 and coupling again the actuator 6 to the lever arm 9 and the door blade 2.

Thus, a very simple mechanism is provided which ensures that the door blade 2 is reliably decoupled from the actuator 6 when the door blade 2 is in the closed position.

FIGS. 3 through 7 show a further embodiment of a door arrangement 1, wherein the same reference numerals are used to designate like components. Different from the embodiment of FIGS. 1 and 2 the rotary actuator 6, which comprises an integrated control unit 20, is fixedly and rigidly coupled to the lever arm 9 at end region 11 thereof. Along the upper edge 23 of the door blade 2 a sliding track 21 is mounted, wherein a distance block 22 is arranged between the sliding track 21 and the door blade 2 such that the sliding track 21 extends parallel to but spaced from the upper edge 23 of the door blade 2.

Figure 4:
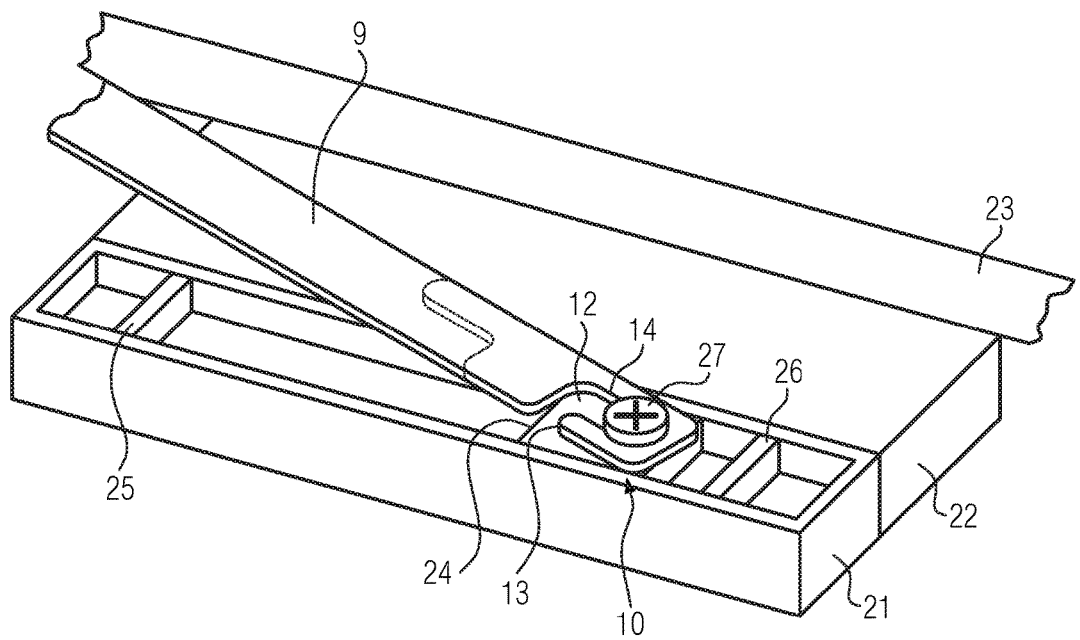
FIG. 4 shows an enlarged view of a portion of FIG. 3.

As shown in the enlarged view of FIG. 4, a slider element 24 is supported in the sliding track 21 such that it is slidably movable in a guided manner along the sliding track 21. The movement of the slider element 24 within the sliding track 21 is limited by two end stops 25 and 26. A screw 27 extends from the upper surface of the slider element 24. At the end region 10 the elongate lever arm 9 is again provided with an elongate through hole 12, which has a generally oval shape and, with respect to the direction of extension of the screw 27 and the actuator rotation axis 7 is laterally defined by sidewalls or lateral walls 14 (see also FIG. 7). In the lateral walls 14 a lateral opening 13 is provided at one of the longitudinal ends of the elongate through hole 12 allowing the screw 27 to enter and exit the through hole 12 when the actuator 6 and the screw 27 are in specific positions, as will be explained in more detail below.

Figure 7:
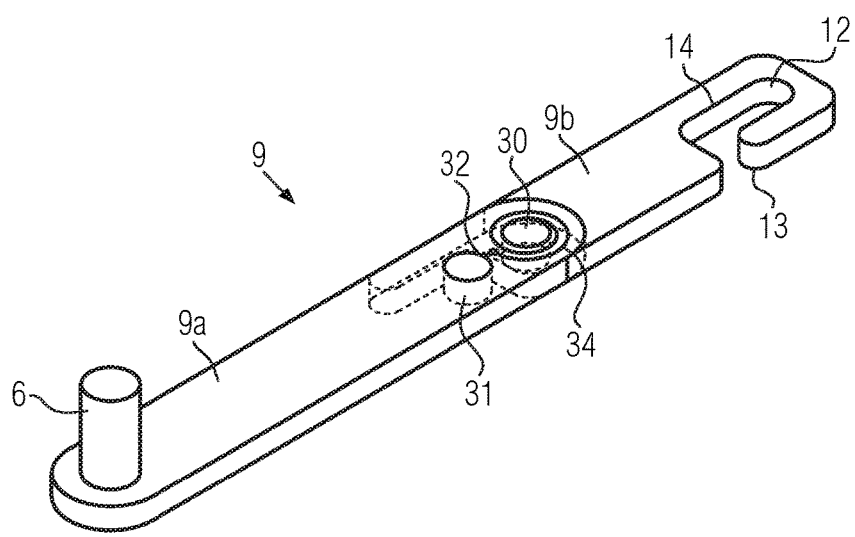
FIG. 7 shows a schematic perspective view of the lever arm.

A more detailed view of the lever arm 9 is shown in FIG. 7. As can be seen in that Figure, the lever arm 9 comprises two elongate portions 9a, 9b, which are coupled to each other at one of their longitudinal ends by a bolt 30. The coupling is such that the two portions 9a, 9b are pivotable with respect to each other, so that the lever arm 9 is able to assume the straight configuration shown in FIG. 7 and an angled configuration (see FIGS. 6a and 6b). A coil spring 34 is provided for biasing the lever arm 9 into the straight configuration corresponding to an angle α of 180°, wherein an end stop bolt 31 is provided on the portion 9a, which cooperates with a curved end face 32 on the other portion 9b to stop the pivoting movement of the portions 9a, 9b under the action of the coil spring 34 in the straight configuration. The curved end face 32 is further configured in such a manner that the pivoting movement of the portions 9a, 9b out of the straight configuration against the biasing action of the coil spring 34 is limited to an angle α, which is larger than 90° and preferably 120° or about 120°. This ensures that the mechanism does not jam. Further, the angle α is preferably significantly smaller than 180°, e.g. smaller than 160° and more preferably smaller than 150° and even more preferably smaller than 140°, in order to facilitate arranging the pin 8 at an end of the through hole 12 remote from the lateral opening 13.

As shown in FIG. 5a, in the open position of the door blade 2 the lever arm 9 is in the straight configuration, and the screw 27 is located inside the through hole 12 out of alignment with the lateral opening 13. In fact, the screw 27 is located at the opposite end of the through hole 12 as compared to the lateral opening 13. This position of the lever arm 9 is a first lever arm position, which corresponds to a first actuator position. Further, the slider block 24 abuts the end stop 25, which assists in preventing movement of the slider 24 and, thereby, an inadvertent escape of the screw 27 out of the lateral opening 13 during e.g. vibrations, flight maneuvers or turbulences.

In order to move the door blade 2 into the closed position the actuator 6 is operated to rotate the lever arm 9 into the counterclockwise direction from FIG. 5a. Due to the out of alignment arrangement of the screw 27 with respect to the lateral opening 13, the lever arm 9 is coupled to the slider block 24 and, thus, to the door blade 2 and is effective to pull the door blade 2 towards the closed position. However, as shown in FIG. 6a, the lever arm 9 assumes the angled position with an angle defined by the stop bolt 31 and the curved end face 32, as explained above. Further, due to the actuator rotation axis 7 and the pivot axis of the door blade being spaced, the slider element 24 moves away from the end stop 25 and along the sliding track 21 towards the end stop 26.

In a third actuator position the door blade 2 eventually reaches the closed position, and the slider element 24 abuts the end stop 25 with the lever arm 9 still being in the angled configuration. This is illustrated in FIG. 6b, from which it can be taken that the screw 27 is still out of alignment with the lateral opening 13 and which shows the lever arm 9 in a third lever arm position.

As a final step of the closing process the actuator 6 is then moved from the third actuator position in the opposite direction into a second actuator position between the first and third actuator positions. This actuator movement returns the lever arm 9 into the straight configuration. Due to the abutment with the end stop 25 the slider element 24 does not move further in the sliding track 21, so that the screw 27 is maintained in a fixed position with respect to the sliding track 21 and the door blade 2 and the door blade 2 is maintained in the closed position. However, the straightening of the lever arm 9 increases the distance between the location, at which the actuator 6 is secured to the lever arm 9, and the lateral opening 13 and, generally, the distance between the two end regions 10, 11 of the lever arm 9. Consequently, the through hole 12 moves with respect to the screw 27, so that the screw 27 moves inside the through hole 12 towards the longitudinal end of the through hole 12 at which the lateral opening 13 is provided. The through hole 12 is dimensioned and the lateral opening 13 is arranged such that the screw 27 is in alignment with the lateral opening 13 as soon as the actuator 6 has reached the second actuator position (coming from the third actuator position) and the lever arm 9 has assumed the straight configuration, which is a second lever arm position (see FIGS. 5b and 6c).

The lever arm position of FIG. 6c is the same as the one shown in FIG. 5b. In that position, which is reached while the door blade 2 is in the closed position, the screw 27 is still engaged in the through hole 12, but—as indicated in FIG. 6c—the door blade 2 is nevertheless able to move towards the open position independent of the actuator 6, in particular in case of a rapid decompression in the compartment 15, without being impeded by the actuator 6, so that structural damage to the aircraft is prevented. This is because the screw 27 is positioned to be able to leave the through hole 12 through the lateral opening 13.

For moving the door blade 2 into the open position it is sufficient to operate the actuator 6 to move the lever arm 9 from the position of FIG. 5b (and FIG. 6c) into the position of FIG. 5a. During this movement the lever arm 9 maintains its straight configuration, and, due to the actuator rotation axis 7 and the pivot axis of the door blade being spaced from each other, the slider element 24 moves along the sliding track 21 towards the end stop 25. The end stop 25 is positioned such that the slider element 24 abuts the end stop 25 prior to the door blade 2 reaching the open position and the lever arm 9 reaching the position of FIG. 5a. Consequently, further rotation of the actuator 6 into the first actuator position causes the screw 27 to move inside the through hole 12 out of alignment with the lateral opening 13.

Thus, a very simple mechanism is again provided which ensures that the door blade 2 is reliably decoupled from the actuator 6 with respect to an opening movement of the door blade 2 when the door blade 2 is in the closed position.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A door arrangement for an interior of an aircraft, the door arrangement comprising:
a frame portion;
a door panel hinged to the frame portion to be pivotable about a pivot axis between a closed position, in which the door panel closes a door opening defined by the frame portion, and an open position, in which the door panel is positioned to allow access through the door opening;
a lever arm;
an actuator mounted to the frame portion and operable to selectively move the door panel between the open position and the closed position via the lever arm engaging the door panel and the actuator, wherein the actuator is movable into a first actuator position, in which the lever arm is in a first lever arm position and the door panel is in the open position, and into a second actuator position, in which the lever arm is in a second lever arm position and the door panel is in the closed position; and an engagement element coupled to the actuator or to the door panel, wherein the actuator is movable into the second actuator position such that the door panel is able to move from the closed position towards the open position independent of the actuator while the actuator remains in the second actuator position, wherein the lever arm comprises an elongated slot to engage the engagement element to allow the actuator to move the door panel between the open position and the closed position via the lever arm, wherein the elongated slot comprises a lateral opening which, by moving the actuator from the first actuator position to the second actuator position, is positionable such that the engagement element is allowed to escape the slot through the lateral opening, thereby allowing movement of the door panel from the closed position towards the open position independent of the actuator, and wherein the lateral opening of the elongated slot extends in a plane substantially parallel to a longitudinal axis of the elongated slot.

2. The door arrangement according to claim 1, wherein the actuator is movable into a third actuator position, in which the door panel is in the closed position and which the actuator assumes upon reaching the closed position when the actuator is operated to move the door panel from the open position into the closed position, wherein in the third actuator position the lever arm is in engagement with the door panel and with the actuator such that the door panel is prevented from moving from the closed position towards the open position independent of the actuator, and wherein movement of the actuator from the third actuator position into the second actuator position changes the engagement between the lever arm and the door panel or actuator such that the movement of the door panel from the closed position towards the open position independent of the actuator is enabled.

3. The door arrangement according to claim 2, wherein when operating the actuator to move from the first actuator position into the third actuator position and to move from the third actuator position into the second actuator position the actuator is moved in the same direction, wherein movement of the actuator from the third actuator position into the second actuator position causes the engagement element to escape the slot through the lateral opening and thereby disengagement of the engagement element from the lever arm to allow movement of the door panel from the closed position towards the open position independent of the actuator, and wherein movement of the actuator from the second actuator position into the third actuator position while the door panel is in the closed position causes the engagement element to enter the slot through the lateral opening and thereby engagement of the engagement element with the lever arm to prevent the door panel from moving from the closed position towards the open position independent of the actuator.

4. The door arrangement according to claim 3, wherein the engagement element is coupled to the actuator, and the lever arm is pivotably secured to the door panel.

5. The door arrangement according to claim 3, further comprising a lever arm stop mechanism, which is arranged such that when the actuator is operated to move the actuator from the first actuator position towards the second actuator position movement of the lever arm is stopped by the lever arm stop mechanism upon the actuator reaching the third actuator position and the lever arm stop mechanism thereby defines the second lever arm position.

6. The door arrangement according to claim 2, wherein when operating the actuator to move from the first actuator position into the third actuator position and to move from the third actuator position into the second actuator position the actuator is moved in opposite directions, wherein movement of the actuator from the third actuator position into the second actuator position causes the engagement element to be positioned within the slot in alignment with the lateral opening when the actuator is in the second actuator position, thereby allowing movement of the door panel from the closed position towards the open position independent of the actuator by the engagement element escaping the slot through the lateral opening, and wherein movement of the actuator from the second actuator position into the first actuator position causes the engagement element to be positioned within the slot out of alignment with the lateral opening when the actuator is in the first actuator position, thereby preventing the engagement element from escaping the slot through the lateral opening when operating the actuator for moving the door panel from the open position into the closed position.

7. The door arrangement according to claim 6, wherein the engagement element is coupled to the door panel, and the lever arm is secured to the actuator.

8. The door arrangement according to claim 6, further comprising a sliding track provided on the door panel, wherein the engagement element is secured to or part of a slider element slidably secured in the sliding track.

9. The door arrangement according to claim 8, further comprising a first end stop and a second end stop limiting movement of the slider element along the sliding track, wherein the slider element is movable along the sliding track between the first and second end stops, and wherein the slider element abuts the first end stop when the actuator is in the first actuator position and the slider element abuts the second end stop when the actuator is in the second actuator position.

10. The door arrangement according to claim 9, wherein the second end stop is positioned such that, when the actuator is operated to move the door panel from the open position into the closed position by moving the actuator at first from the first actuator position into the third actuator position and subsequently from the third actuator position into the second actuator position, in the third actuator position the slider element abuts the second end stop, the lever arm is in a third lever arm position different from the second lever arm position, and the engagement element is positioned within the slot out of alignment with the lateral opening, and when subsequently moving the actuator from the third actuator position into the second actuator position the abutment between the slider element and the second end stop is maintained and movement of the lever arm from the third lever arm position into the second lever arm position thereby causes movement of the engagement element along the slot into a position in alignment with the lateral opening.

11. The door arrangement according to claim 10, wherein the lever arm comprises two portions, which are connected to each other to be pivotable with respect to each other about a pivot axis, and end stops adapted to limit the pivoting movement of the two portions with respect to each other between a first angle and a second angle, wherein the slot is provided in one of the two portions and the actuator is secured to the other one of the two portions, a distance between a location at which the lever arm contacts the actuator and the slot is greater when the two portions assume the first angle than when the two portions assume the second angle, in the third lever arm position the two portions assume the second angle and in the second lever arm position the two portions assume the first angle, and an increase of the distance between the location at which the lever arm contacts the actuator and the slot upon movement of the actuator from the third actuator position into the second actuator position together with abutment of the slider element against the second end stop causes movement of the engagement element along the slot from a position out of alignment with the lateral opening into a position in alignment with the lateral opening.

12. The door arrangement according to claim 9, wherein the first end stop is positioned such that, when the actuator is operated to move the door panel from the closed position into the open position by moving the actuator from the second actuator position into the first actuator position, the slider element moves along the sliding track from the second end stop towards the first end stop while the engagement element is positioned within the slot in alignment with the lateral opening, the slider element reaches and abuts the first end stop prior to the actuator reaching the first actuator position, and during further movement of the actuator into the first actuator position the abutment between the slider element and the first end stop is maintained and movement of the lever arm into the first lever arm position thereby causes movement of the engagement element along the slot into a position out of alignment with the lateral opening.

13. The door arrangement according to claim 1, wherein the actuator is a rotary actuator having an axis of rotation spaced from the pivot axis of the door panel.

14. An aircraft comprising a first compartment and a second compartment separated by a wall, wherein the door arrangement according to claim 1 is provided in the wall.

* * * * *